United States Patent [19]

Talbot et al.

[11] 4,202,887
[45] May 13, 1980

[54] LIVESTOCK FEED SUPPLEMENT

[75] Inventors: Tully W. Talbot, Audubon, Iowa; George T. Barrows, Kansas City, Mo.; Granville B. Thompson, Amarillo, Tex.

[73] Assignee: Redel, Inc., Kansas City, Mo.

[21] Appl. No.: 810,296

[22] Filed: Jun. 27, 1977

[51] Int. Cl.$^2$ ............................................. A23K 1/00
[52] U.S. Cl. ........................................ 424/154; 426/2; 426/74; 426/807
[58] Field of Search ............... 426/69, 2, 72, 74, 73, 426/635, 636, 807; 424/154, 155, 156

[56] References Cited

U.S. PATENT DOCUMENTS

| | | | |
|---|---|---|---|
| 2,808,332 | 10/1957 | Anderson et al. | 426/807 |
| 3,579,634 | 5/1971 | Brown | 424/154 |
| 3,794,740 | 2/1974 | Achorn et al. | 426/69 |
| 3,898,328 | 8/1975 | Beigler et al. | 424/154 X |

OTHER PUBLICATIONS

Miller et al., "Relation of Dietary Carbohydrate, Magnesium and Potassium to Grass Tetnay," Chem. Abstr. vol. 85:158239z, 1976.

*Primary Examiner*—R. B. Penland
*Attorney, Agent, or Firm*—Henderson & Sturm

[57] ABSTRACT

A feed composition designed to prevent grass tetany in livestock. Neutral or acidic magnesium salts are completely dissolved in a liquid energy source to provide readily available magnesium ions which, when ingested, increase blood serum magnesium levels in the animal sufficient to avert hypomagnesemia. The liquid energy source is selected from a group of materials which are immediately absorbed from the alimentary canal without the necessity of undergoing digestion. Thus, the feed supplement provides an instantly available source of both magnesium and energy, which combination acts to prevent grass tetany in livestock.

3 Claims, No Drawings

LIVESTOCK FEED SUPPLEMENT

BACKGROUND OF THE INVENTION

This invention relates generally to livestock feed compositions and more particularly to a feed composition designed to avert grass tetany in livestock. The feed composition is a stable solution of magnesium salts completely dissolved in a liquid energy source. The liquid feed supplement may be made available to the animals in appropriately located lick wheel feeders or other convenient liquid feed dispensing devices.

Grass tetany, also known as grass staggers, wheat pasture poisoning and downer syndrome, has long been a problem of magnitude in grass-fed cattle, sheep, goats, horses, and swine. Nutritional tetany is a useful, correct term for several disorders in livestock which are characterized by hypomagnesemia. Hypomagnesemia results in tonic and clonic muscular contractions and sudden death of the animal. Fibrillary twitchings of the muscles are followed by either a sustained contraction of muscles or jerking muscular contractions. The cardiac muscle also displays hyperirritability. Breathing becomes rapid and noisy, salivation may occur; and death follows either through spasm of the thoracic or cardiac muscles, or both.

Livestock grazing rapidly growing grasses are highly susceptible to grass tetany. Such grasses are usually low in magnesium and low in available carbohydrates; sucrose, fructose, glucose and other hexoses; but high in potassium.

The cause of tetany is not completely understood. Studies have indicated conflicting reports on the nutritional status of the affected animals. Aside from the deficiency of magnesium it has been suggested that other factors contribute to the disorder. Among these factors are low intakes of soluble carbohydrates, energy or dry matter; and high intakes of non-protein nitrogen, potassium, and transaconitate. Further, low levels of manganese, cobalt, phosphorus, sulfate, citrate and possibly other trace minerals contribute to the disorder.

It is well known that the onset of grass tetany in grass fed animals is due to a sudden fall in the level of magnesium ions in the blood stream; hence, the name hypomagnesemia. Although many factors are thought to contribute to the onset of tetany, the control of magnesium metabolism appears to be the primary issue. Hypomagnesemia is the first sign of the metabolic disorder and the whole problem can be eliminated by providing high levels of dietary megnesium which obviates the need for homostatic control.

To avert tetany in grass fed cattle, sheep, goats, horses, and swine, the animals must consume sufficient amounts of magnesium to maintain 2 to 3 milligrams of magnesium per 100 milliliters of blood serum. Attempts have been made to provide the necessary magnesium to grazing animals via magnesium compounds fed as loose minerals; or magnesium compounds mixed with solid feedstuffs, mixed with the drinking water, incorporated in salt blocks, and mixed with molasses.

Feeding magnesium compounds as loose minerals has not proved successful in averting tetany. Although feeding magnesium compounds in this manner can reduce the incidence of grass tetany, animals will not voluntarily consume sufficient amounts to alleviate the symptoms of hypomagnesemia. It has been suggested that animals refuse the magnesium compounds since they are highly unpalatable. Magnesium carbonate and magnesium oxide are only slightly soluble in saliva and do not readily ionize so that the animal is unable to detect the presence of magnesium. Magnesium acetate, magnesium chloride, and magnesium sulfate are hygroscopic, become solutions which either intermingle with other mineral components or leak from their container. Since these compounds are unstable, they are unsatisfactory.

In order to overcome the problems associated with feeding magnesium compounds as loose minerals, magnesium compounds have been admixed with solid feedstuffs, such as corn. This approach has also proved unsatisfactory for various reasons.

Due to the difference in the particle size of the magnesium compounds and the solid feed, there is a segregation of materials. Since a homogenous mixture cannot be maintained, some portions of the feed are rich in magnesium while other portions are deficient. Thus, the animals intake of needed magnesium in unpredictable.

Further, admixing magnesium with solid feed is costly both in terms of needed labor and in terms of material costs. High labor costs result due to the necessity of daily hand feeding, making this approach unfeasible under range conditions. Also, it is felt that the animals' consumption of the mixture is dictated by the desire for the solid feedstuff, such as corn rather than their need for magnesium.

Common practice has been to mix magnesium oxide in grain and transport sufficient quantities of the mixture to grazing animals daily when, in the mind of the feeder, grass tetany became imminent, or when one or more of the animals have succumbed. This practice is costly in terms of the grain and labor used; and justification for these high costs is based on either speculation as to the need, or a desperate attempt to minimize losses. It has become obvious that a more systematic, manageable approach is needed.

Attempts to incorporate magnesium compounds into block form, generally with salt, have met with little success. The problems associated with feeding loose minerals also apply to this approach. Either the block is unpalatable, unstable, or the block is consumed based on the animals' desire for a component other than magnesium.

Addition of magnesium compounds to the animal's drinking water has met with some success in averting tetany. However, this approach requires that the animals have access only to the treated water, a requirement that is often unfeasible under range conditions. Further, it has been observed that the compounds precipitate from solution under range conditions and become unavailable to the animals.

Feeding of a mixture of magnesium compounds and molasses has been known for some time. This method is not practical, however, since molasses is a product of commerce which varies widely, frequently being very high in potassium. Potassium, when fed with grasses also high in potassium, contributes to grass tetany since it restricts the absorption of magnesium into the blood stream.

Further, it has been demonstrated that the intake of the molasses mixture is controlled by the animals' desire for molasses. In U.S. Pat. No. 3,794,740, Achorn uses an overfeeding preventative such as ammonium sulfate or sodium chloride in a molasses containing feed supplement, which acts as a governor on the animals' appetite. (It should be noted, however, that ammonium per se, being alkaline, slows the absorption of magnesium into the blood stream).

While molasses is sometimes considered an energy source, the contained disaccharide must be inverted before it is available for absorption by the blood stream. The sucrose contained in the molasses must be digested in the alimentary canal, or inverted, to produce glucose and fructose before it can be absorbed into the blood stream where energy yielding compounds are needed. The low energy condition, thought to be a factor in tetany, is, therefore, not immediately overcome by the ingestion of molasses. Due to the time lag associated with digestion, molasses does not provide a readily available energy source.

Those concerned with the control of grass tetany and other magnesium dificiency related conditions recognize that the existing methods of control are inadequate.

SUMMARY OF THE INVENTION

This invention is a feed supplement designed to avert hypomagnesemia and subsequent tetany in domestic livestock. Study of the various parameters leading to the clinical manifestation of tetany discloses a relationship signaling a better preventative than the feeding of magnesium alone. This invention was formulated based on the premise that carbohydrate, or energy deficits, and excessive potassium levels in the ration contribute to tetany.

The feed supplement of this invention contains a liquid energy source which is recognizable by the animal; and which is immediately absorbed from the alimentary canal without the necessity of undergoing digestion, as is necessary with grain or molasses. The liquid energy source also serves as a solvent in which magnesium salts are completely dissolved. Also, the composition is substantially free of other conflicting ions, such as potassium. In one embodiment of the invention water is added to the solution to provide a suitable viscosity so that the composition will adhere to the wheel of a lick tank.

This invention depicts a novel and unexpected method of supplying animals with instantly available magnesium ions from magnesium compounds which are slightly acidic in nature or which contribute to an acidic pH, particularly in the alimentary canal. Magnesium salts are dissolved in a liquid source of energy to form the composition. The animal can, therefore, partake of its needs according to the dictates of its internal system; thus, having of its own free will even a therapeutic dose of available magnesium and avoiding the dangers of tetany and allied symptoms. Further, the composition is stable; thus, it can be positioned on pasture or range for long periods without the necessity of daily attention by the feeder.

The feed composition of this invention provides grass fed cattle, sheep, goats, horses and swine with a stable, readily available source of magnesium which they consume free choice in amounts sufficient to maintain blood magnesium levels of 2 to 3 milligrams of magnesium per hundred millimeters of blood serum. Thus, tetany is averted and the need of daily transportation of a magnesium source to the field is eliminated. Other attempts along this line have failed.

Unexpectedly, the simultaneous provision of immediate and highly available sources of both energy and magnesium ions, in a field stable composition, induces animals to consume sufficient magnesium on a self-fed basis to avert grass tetany. Heretofore, animals consumed sufficient magnesium only when the magnesium compound had been mixed with grain or molasses. Since the energy source need not be digested before being absorbed into the blood stream, the needed nutrients are readily available. The availability of the needed nutrients is comparable to the injection of needed substances into the blood stream with a hypodermic needle. The substance can be used immediately in intermediate metabolism, but are consumed free choice orally.

This invention involves the use of a liquid form of energy in which magnesium compounds, being in the nature of weak electrolytes, and being perferrably acidic, are dissolved to the extent of their solubility.

Where the viscosity of the composition must be controlled, such as where the composition is fed from a lick tank, sufficient viscosity is given to the composition by the addition of water. The combination of ingredients in these compositions, including water, produces the necessary viscosity for this purpose.

It is the lack of magnesium ions in the blood stream which causes hyperirritability of neuromuscular tissue and the resulting convulsions associated with tetany. Normally, the magnesium level in the blood serum is two to three milligrams of magnesium per 100 milliliters of blood serum; and 80 percent of this magnesium is ionized and diffusible, the remainder perhaps being bound to protein. The magnesium in bone is in the form of a compound not readily available for instant reabsorption by the blood. The blood system bathes cardiac and skelatal muscle as well as that part of the nervous system ennervating these muscles. Magnesium ions are needed for the propogation of nerve impulses and normal muscle contractions; the muscle tissue normally containing 21 milligram percent magnesium.

Most importantly, magnesium is also needed for the utilization of carbohydrates in intermediate metabolism. The composition of this invention supplies both energy and magnesium which work in a synergestic manner to avert tetany. While energy is frequently low in tetany causing grasses, the use of those carbohydrates available may well be impaired by the very absence of magesium ions. Hence, the animal has two related needs satisfied, the effects of the individual sources of magnesium ions and energy being greater when supplied together than the sum of the two when supplied separately.

Both the energy source and the magnesium are immediately absorbed from the animals alimentary canal without the necessity of undergoing digestion as in the case of the classical grain or molasses mixed together with the magnesium compound. Because the composition employs a weak electrolyte, such as magnesium acetate, the composition furnishes magnesium ions to the blood stream immediately upon absorption.

Tetany producing grasses are frequently high in potassium. The use of acidic salts of magnesium not only aids a rapid absorption of ions into the blood stream, but also helps to combat the alkalinity of grasses. Magnesium compounds suitable for use in the composition of this invention include, but are not limited to, magnesium acetate, magnesium acetylsalicylate, magnesium biphosphate, magnesium bisulfate, magnesium butyrate, magnesium chloride, magnesium citrate, magnesium lactate, magnesium monophosphate, magnesium oleate, magnesium propionate, magnesium salicylate, magnesium sulfate, magnesium thiosulfate, magnesium valerate, and hydrates of these magnesium compounds. An acidic composition also increases the palatability of the prophylactic composition, since it provides the animal with a method of adjusting the pH in the alimentary canal. In this respect, the composition is far superior to molasses, which is frequently high in potassium and calcium.

Liquid energy sources suitable for use in the composition include, but are not limited to, propylene glycol, ethanol, normal propanol and glycerol. Glycerol is the least desirable of these energy sources, because it is product of fat metabolism; however, it is still considered a good source of immediate energy. Propylene glycol on oxidation yields acetic and pyruvic acids, which not only help to counteract the alkaline nature of tetany producing grasses, but the pyruvic acids enters the carbohydrate cycle of oxidation in the blood stream helping the animal overcome its energy deficiency.

In mammalian intermediate metabolism glucose yields its energy to cells through complicated pathways. One such path is called the TCA or tricarboxylic acid cycle. Pyruvic acid, from blood sugar either directly absorbed or created in the liver by gluconeogenesis, is a step in the process. In intermediate metabolism, propylene glycol is even a step ahead of glucose. Acetic acid also enters the TCA pathway.

Magnesium acetate, when dissolved in water, yields magnesium ions and acetic acid, a relatively weak energy source. However, the animal will not voluntarily consume the solution alone because of the unpalatability. Thus, it was unexpected that animals would voluntarily consume the composition of this invention, which contains magnesium ions in a readily available energy source.

An object of the present invention is the provision of a feed supplement which simultaneously provides magnesium ions and energy in an instantly available form.

Another object is to provide a feed supplement for averting tetany which will be voluntarily consumed by animals on a free choice basis.

A further object of the invention is the provision of the feed supplement for averting tetany which is convenient and economical to use under range conditions.

Still another object is to provide a feed composition effective to avert tetany which is stable and continuously available to the animals under range conditions.

A still further object of the present invention is to provide a feed supplement effective to avert tetany which does not require daily attention of the feeder.

Another object is to provide a feed supplement to avert tetany which is suitable for use in a lick wheel feeder.

Other objects, advantages, and novel features of the present invention will become apparent from the following detailed description of the invention when considered in conjunction with the accompanying examples.

DESCRIPTION OF THE PREFERRED EMBODIMENT

The following specific examples will serve to illustrate the invention. In all cases the liquid feed supplement provides sufficient magnesium ions to avert tetany in grass fed animals. The compositions are stable under range conditions, remaining in solution for extended periods of time and remaining fluid at 0° F.

EXAMPLE 1

A liquid feed supplement was prepared having the following composition.

| Ingredient | Weight % | Weight in lbs. |
|---|---|---|
| Magnesium acetate quadrahydrate | 18.3 | 0.29 |
| Magnesium chloride hexahydrate | 18.3 | 0.29 |
| Propylene glycol | 31.7 | 0.50 |
| Water | 31.7 | 0.50 |
|  | 100.0 | 1.58 |

The magnesium salts were completed dissolved in the propylene glycol-water solution by heating to 66° C. In this composition the viscosity is such that the composition will adhere to the wheel of a lick tank. The composition did not separate nor freeze at 0° F. when placed in the field for four weeks.

The composition prepared by the method described above contains magnesium salts added to the extent of their solubility. The dissociated magnesium ions are present in the composition in a concentration equivalent to approximately 4 percent by weight; thus, one pound of supplement ingested provides the animal with approximately 18 grams of available magnesium ions. One pound of the supplement consumed daily would provide 18 grams of magnesium, a therapeutic dose for large animals, such as cattle. One half pound of the supplement consumed daily would provide 9 grams of magnesium, a prophylactic dose for large animals and a therapeutic dose for small animals, such as sheep.

Propylene glycol has long been recognized as a fast, rich energy source and a preventative for ketosis (impaired fat metabolism in absence of glucose). Therefore, the magnesium and the propylene glycol are synergistic in their action to avert tetany.

The formula has been fed free-choice to cattle and prevents grass tetany and sub-clinical magnesium deficiencies and imbalances that occur due to variations in the mineral composition of feedstuffs and plants. The formula provides a unique combination of a soluble and palatable source of magnesium in an energy rich solution.

EXAMPLE 2

It is anticipated that the following composition would be efficient in preventing grass tetany and allied symptoms in livestock. Sufficient viscosity should be produced by the addition of water, as compared with Examples 11 through 21 to allow the composition to adhere to the wheel of a lick feeder.

| Ingredient | Weight % | Weight in Lbs |
|---|---|---|
| Magnesium acetate quadrahydrate | 35.0 | 1.05 |
| *Ethanol (SDA 35A) | 35.0 | 1.05 |
| Water | 30.0 | .90 |
|  | 100.0 | 3.00 |

*Specially denatured SDA 35A U.S. Treasury Department

The anticipated composition would contain 3.9 percent by weight magnesium ions; thus, one-half pound of the mixture would provide 8.8 grams of magnesium. The composition would be slightly acidic in nature.

EXAMPLE 3

It is anticipated that the following composition would be efficient in preventing grass tetany and allied symptoms in livestock. Sufficient viscosity should be produced by the addition of water, as compared with examples 11 through 21, to allow the composition to adhere to the wheel of a lick feeder.

| Ingredient | Weight % | Weight in Lbs |
|---|---|---|
| Magnesium acetylsalicylate | 15.0 | .45 |
| Magnesium biphosphate | 35.0 | 1.05 |
| Propylene glycol | 30.0 | .90 |
| Water | 20.0 | .60 |
| | 100.0 | 3.00 |

The anticipated composition would contain 4 percent by weight magnesium ions; thus, one-half pound of the mixture would provide 9 grams of magnesium. The composition would be slightly acidic in nature.

EXAMPLE 4

It is anticipated that the following composition would be efficient in preventing grass tetany and allied symptoms in livestock. Sufficient viscosity should be produced by the addition of water, to allow the composition to adhere to the wheel of a lick feeder.

| Ingredient | Weight % | Weight in Lbs |
|---|---|---|
| Magnesium chloride hexahydrate | 30.0 | .90 |
| Magnesium bisulfate | 15.0 | .45 |
| Ethanol (SDA 35A) | 20.0 | .60 |
| Propylene glycol | 20.0 | .60 |
| Water | 15.0 | .45 |
| | 100.0 | 3.00 |

The anticipated composition would contain 5.2 percent by weight magnesium ions; thus, one-half pound of the mixture would provide 11.7 grams of magnesium ions. The composition would be slightly acidic in nature.

EXAMPLE 5

It is anticipated that the following composition would be efficient in preventing grass tetany and allied symptoms in livestock. Sufficient viscosity should be produced by the addition of water, to allow the composition to adhere to the wheel of a lick feeder.

| Ingredient | Weight % | Weight in Lbs |
|---|---|---|
| Magnesium butyrate | 30.0 | .90 |
| Magnesium oleate | 10.0 | .30 |
| propylene glycol | 30.0 | .90 |
| glycerol | 15.0 | .45 |
| water | 15.0 | .45 |
| | 100.0 | 3.00 |

The anticipated composition would contain 3.2 percent by weight magnesium ions; thus, one-half pound of the mixture would provide 7.2 grams of magnesium ions. The composition would be neutral to slightly acidic in nature.

EXAMPLE 6

It is anticipated that the following composition would be efficient in preventing grass tetany and allied symptoms in livestock. Sufficient viscosity should be produced by the addition of water, to allow the composition to adhere to the wheel of a lick feeder.

| Ingredient | Weight % | Weight in Lbs |
|---|---|---|
| Magnesium chloride hexahydrate | 18.5 | .555 |
| Magnesium acetate quadrahydrate | 18.5 | .555 |
| n-propanol | 30.0 | .900 |
| propylene glycol | 32.0 | .960 |
| water | 1.0 | .030 |
| | 100.0 | 3.000 |

The anticipated composition would contain 4.3 percent by weight magnesium ions; thus, one-half pound of the mixture would provide 9.7 grams of magnesium ions. The composition would be slightly acidic in nature.

EXAMPLE 7

It is anticipated that the following composition would be efficient in preventing grass tetany and allied symptoms in livestock. Sufficient viscosity should be produced by the addition of water to allow the composition to adhere to the wheel of a lick feeder.

| Ingredient | Weight % | Weight in Lbs |
|---|---|---|
| Magnesium propionate | 28.0 | .84 |
| n-propanol | 30.0 | .90 |
| glycerol | 10.0 | .30 |
| water | 32.0 | .96 |
| | 100.0 | 3.00 |

The anticipated composition would contain 3.5 percent by weight magnesium ions; thus, one-half pound of the mixture would provide 7.9 grams of magnesium ions. The composition would be slightly acidic in nature.

EXAMPLE 8

It is anticipated that the following composition would be efficient in preventing grass tetany and allied symptoms in livestock. Sufficient viscosity should be produced by the addition of water to allow the composition to adhere to the wheel of a lick feeder.

| Ingredient | Weight % | Weight in Lbs |
|---|---|---|
| Magnesium citrate | 30.0 | .90 |
| n-propanol | 20.0 | .60 |
| propylene glycol | 25.0 | .75 |
| water | 25.0 | .75 |
| | 100.0 | 3.00 |

The anticipated composition would contain 3 percent by weight magnesium ions; thus, one-half pound of the mixture would provide 6.8 grams of magnesium ions. The composition would be slightly acidic in nature.

EXAMPLE 9

It is anticipated that the following composition would be efficient in preventing grass tetany and allied symptoms in livestock. Sufficient viscosity should be produced by the addition of water to allow the composition to adhere to the wheel of a lick feeder.

| Ingredient | Weight % | Weight in Lbs. |
|---|---|---|
| Magnesium malate | 25.0 | .75 |
| Magnesium valerate | 25.0 | .75 |
| Ethanol (SDA 35A) | 10.0 | .30 |
| Propylene glycol | 35.0 | 1.05 |

| Ingredient | Weight % | Weight in Lbs. |
|---|---|---|
| Water | 5.0 | .15 |
| | 100.0 | 3.00 |

The anticipated composition would contain 5.5 percent by weight magnesium ions; thus, one-half pound of the mixture would provide 12.5 grams of magnesium ions. The composition would be slightly acidic in nature.

EXAMPLE 10

It is anticipated that the following composition would be efficient in preventing grass tetany and allied symptoms in livestock. Sufficient viscosity should be produced by the addition of water, as contrasted with examples 11 through 21, to allow the composition to adhere to the wheel of a lick feeder.

| Ingredient | Weight % | Weight in Lbs. |
|---|---|---|
| Magnesium sulfate heptahydrate | 28.0 | .84 |
| Magnesium lactate | 10.0 | .30 |
| Magnesium salicylate | 3.0 | .09 |
| Ethanol (SDA 35A) | 34.0 | 1.02 |
| Water | 25.0 | .75 |
| | 100.0 | 3.00 |

The anticipated composition would contain 3.8% by weight magnesium ions; thus, one-half pound of the composition would provide 8.7 grams of magnesium ions and instantly available energy. The composition would be slightly acidic in nature.

EXAMPLE 11

It is anticipated that since 1 gram of magnesium chloride will dissolve in 2 ml of alcohol that the following example can be prepared by stirring the magnesium chloride vigorously into the specially denatured ethyl alcohol.

| Ingredient | Weight | Weight in Lbs |
|---|---|---|
| Magnesium chloride hexahydrate | 34.5 | 1.035 |
| Ethanol (SDA 35A) | 65.5 | 1.965 |
| | 100.0 | 3.000 |

The composition would not be viscous and should not be fed in a lick tank, but rather in a ball type feeder similar to roll on containers and to smaller animals such as calves or lambs. It would be neutral to slightly acid as regards pH, but would contribute chloride ions to counterbalance high levels of potassium in forages; thus helping to avert grass tetany and similar symptoms.

The anticipated composition would contain 4 percent by weight magnesium ions; thus one-half pound of the composition would provide 9 grams of magnesium ions daily for smaller livestock.

Ethanol can be used directly as a source of energy by mammalian cells and does not require digestion. Thus, energy and magnesium ions would be instantly available for tissue use as needed to avert the symptoms of grass tetany.

EXAMPLE 12

It is anticipated that the following composition could be efficient in preventing grass tetany and allied symptoms in livestock:

| Ingredient | Weight % | Weight in Lbs |
|---|---|---|
| Magnesium Valerate | 33.3 | 1.0 |
| Ethanol (SDA 35A) | 66.7 | 2.0 |
| | 100.0 | 3.0 |

The composition would not be viscous and should not be fed in a lick tank, but rather in a ball type feeder similar to roll on containers and to smaller animals such as calves or lambs. It would be neutral to slightly acidic as regards pH.

The anticipated composition would provide 7.9 grams of magnesium ions per one-half pound of supplement, having said ions present as 3.5 percent by weight of the supplement.

Ethanol can be used directly as a source of energy by mammalian cells and does not require digestion. Thus, energy and magnesium ions would be instantly available for tissue use as needed to avert the symptoms of grass tetany, acting together in a synergistic manner.

EXAMPLE 13

It is anticipated that the following composition would be efficient in preventing grass tetany and allied symptoms in livestock:

| Ingredient | Weight % | Weight in Lbs. |
|---|---|---|
| Magnesium Sulfate Heptahydrate | 15.4 | .50 |
| Magnesium Salicylate | 7.7 | .25 |
| Glycerol | 46.1 | 1.50 |
| Ethanol | 30.8 | 1.00 |
| | 100.0 | 3.25 |

The composition should be achieved by slight heating and vigorous stirring and would be somewhat more viscous than Examples 11 and 12. It should, however, be fed in a ball type feeder or a similar feeding device.

The anticipated composition would contain 2 percent by weight magnesium ions and hence one pound would contain 9 grams. The composition could be fed to smaller animals such as lambs and calves.

The composition would be neutral to slightly acidic and would help to balance high levels of potassium and calcium in forages.

Ethyl alcohol, as mentioned, can be used directly as a source of energy by mammalian cells and does not require digestion. While, glycerol does require digestion, it is also a source of concentrated energy and the composition would contain energy and magnesium ions sufficient to act synergistically in averting symptoms of grass tetany in livestock.

EXAMPLE 14

It is anticipated that the following composition would be very efficient in preventing grass tetany and allied symptoms in livestock:

| Ingredient | Weight % | Weight in Lbs. |
|---|---|---|
| Magnesium Acetate Quadrahydrate | 34.5 | 1.035 |
| Ethanol (SDA 35A) | 65.5 | 1.965 |
| | 100.0 | 3.000 |

The composition would not be viscous and should not be fed in a lick tank, but rather in a ball type feeder similar to roll on containers or similar device. It would be neutral to slightly acidic as regards pH.

The anticipated composition would provide 3.9 percent by weight magnesium ions in a source of liquid energy; thus there would be 8.7 grams in one-half pound.

Ethanol can be used directly as a source of energy by mammalian cells and does not require digestion. Thus, energy and magnesium ions would be instantly available for tissue use as needed to avert the symptoms of grass tetany, acting together in a synergistic manner.

EXAMPLE 15

| Ingredient | Weight % | Weight Lbs. |
|---|---|---|
| Magnesium Acetate Quadrahydrate | 30.0 | .90 |
| Magnesium Lactate | 8.0 | .24 |
| Propylene glycol | 32.0 | .96 |
| Ethanol (SD 35A) | 30.0 | .90 |
| | 100.0 | 3.00 |

It is anticipated that the above composition would be very efficient in preventing grass tetany and allied symptoms in livestock, having 4.0 percent magnesium ions in the composition or 9 grams in one-half pound.

The above composition provides magnesium ions and two sources of liquid energy in a slightly acidic composition to provide synergistically instantly available magnesium and energy.

EXAMPLE 16

It is anticipated that the following composition would be efficient in preventing tetany and allied symptoms in livestock.

| Ingredient | Weight % | Weight in Lbs. |
|---|---|---|
| Magnesium chloride hexahydrate | 33.5 | 1.005 |
| Magnesium oleate | 4.0 | .120 |
| Propylene glycol | 32.5 | .975 |
| Glycerol | 30.0 | .900 |
| | 100.0 | 3.000 |

This composition would not be particularly viscous and should not be fed in a wheeled lick tank, but could be offered with a roll-on ball type feeder or open container.

Magnesium oleate, although not as rich in magnesium ions as magnesium chloride, modifies the composition with glycerol, a source of energy, but not as instantly available as propylene glycol.

The composition would be neutral to slightly acid and would provide chloride ions as well as oleic acid to balance an excess of potassium ions in the co-fed feedstuffs. Glycerol requires digestion before functioning as a source of energy, but is an excellent source of said energy and serves to modify the sharper taste of propylene glycol which is, indeed, instantly available for mammalian tissue.

The composition contains 4 percent by weight magnesium ions and one-half pound would then furnish 9 grams.

| Ingredient | Weight % | Weight in Lbs. |
|---|---|---|
| Magnesium chloride hexahydrate | 17.5 | .525 |
| Magnesium acetate quadrahydrate | 17.5 | .525 |
| n-propanol | 65.0 | 1.950 |

-continued

| Ingredient | Weight % | Weight in Lbs. |
|---|---|---|
| | 100.0 | 3.000 |

It is anticipated that this composition would be quite "sharp" to the tongue and should be fed in a mechanism where animals must lick only as needed. Propanol is absorbed into the blood stream immediately after ingestion and used by mammalian tissue as a source of energy when not admixed with molasses or other carrier which would tend to hold the n-propanol in the digestive system for use by microorganisms.

The composition would be a synergistic mechanism to provide livestock with instant energy and magnesium ions, and would be acidic in nature and provide chloride ions to counterbalance high levels of potassium in the forage. As such it should be an excellent mechanism for averting grass tetany and allied symptoms in livestock.

Magnesium ions are present at the 4 percent by weight level and one-half pound would provide 9 grams.

EXAMPLE 18

It is anticipated that the following composition could be fashioned by vigorous shaking and slight heating.

| Ingredient | Weight % | Weight in Lbs. |
|---|---|---|
| Magnesium valerate | 30.0 | .90 |
| Magnesium oleate | 5.0 | .15 |
| Glycerol | 15.0 | .45 |
| n-propanol | 50.0 | 1.50 |
| | 100.0 | 3.00 |

This composition would contain 3.3 percent by weight magnesium ions and one-half pound would contain 7.5 grams. It would be acidic in nature and the 15 percent glycerol, although requiring digestion, would modify the taste of Example 17 so that livestock would more readily lick the mechanism supplying the composition. It is anticipated that the composition would be sufficiently synergistic in having an instantly available energy source and magnesium ions in an acid medium to avert symptoms of tetany and allied symptoms in livestock.

EXAMPLE 19

It is anticipated that the following composition could be fashioned by shaking and slight heating.

| Ingredient | Weight % | Weight Lbs. |
|---|---|---|
| Magnesium chloride hexahydrate | 17.5 | .525 |
| Magnesium acetate quadrahydrate | 17.5 | .525 |
| n-propanol | 30.0 | .900 |
| Ethanol (SDA 35A) | 35.0 | 1.050 |
| | 100.0 | 3.000 |

Magnesium ions are present at the 4 percent by weight level and one-half pound would provide 9 grams. The composition should be offered to livestock in a tightly closed feeder and should be synergistic in providing two sources of instantly available energy with magnesium ions in an acidic medium with chloride to offset any excess potassium in the forage and should prevent hypomagnesemia and allied symptoms in livestock grazing on forages which would tend to produce the symptoms without this supplement.

EXAMPLE 20

It is anticipated that the following composition could be fashioned by shaking and slight heating.

| Ingredient | Weight % | Weight Lbs. |
|---|---|---|
| Magnesium sulfate heptahydrate | 30.0 | .90 |
| glycerol | 50.0 | 1.50 |
| n-propanol | 20.0 | .60 |
|  | 100.0 | 3.00 |

Magnesium ions are present at the 2.9 percent by weight level and one-half of one pound will yield 6.6 grams. There is instant energy in the form of n-propanol and magnesium ions in a slightly acidic medium to act synergistically to avert hypomagnesemia and related symptoms in livestock grazing pastures which could otherwise produce symptoms of grass tetany.

EXAMPLE 21

| Ingredient | Weight % | Weight Lbs. |
|---|---|---|
| Magnesium sulfate heptahydrate | 15.0 | .45 |
| Propylene glycol | 40.0 | 1.20 |
| n-propanol | 45.0 | 1.35 |
|  | 100.0 | 3.00 |

Magnesium ions in an acidic medium are instantly available with energy sources, both of which are instantly available, at the rate of 1.4 percent by weight magnesium ions or 3.2 grams per one-half pound of supplement.

This composition should be easily produced and when fed in a suitable feeder so that animals lick rather than drink, the supplement should avert symptoms of hypomagesemia and allied symptoms in a synergistic manner when livestock are pastured on grasses and other forage which could otherwise produce such symptoms.

Table I is a summary of the Examples 1–21. Table I shows the weight percent of the ingredients of the liquid feed formulae represented by the Examples; including the magnesium salts, the magnesium ions derived from the various magnesium salts, the readily available liquid energy source, and the added water, if any.

TABLE I
WEIGHT PERCENT OF COMPONENTS IN FEED COMPOSITIONS OF EXAMPLES 1-21

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Mg. Acetate $Mg(C_2H_3O_2)_2 \cdot 4H_2O$ | 18.3 | 35.0 | | | | 18.5 | | | | | |
| Mg. Acetylsalicylate $Mg(CH_3COO\text{-}C_6H_4COO)_2$ | | | 15.0 | | | | | | | | |
| Mg. Biphosphate $Mg\,H_4(PO_4)_2 \cdot 3H_2O$ | | | | 35.0 | | | | | | | |
| Mg. Bisulfate $Mg\,H_2(SO_4)_2$ | | | | | 15.0 | | | | | | |
| Mg. Butyrate $Mg(C_4H_7O_2)_2$ | | | | | | | 30.0 | | | | |
| Mg. Chloride $MgCl_2 \cdot 6H_2O$ | 18.3 | | | 30.0 | | 18.5 | | | | | 34.5 |
| Mg. Citrate $Mg_3(C_6H_5O_7)_2 \cdot 14H_2O$ | | | | | | | | 30.0 | | | |
| Mg. Lactate $Mg(C_3H_5O_3)_2 \cdot 3H_2O$ | | | | | | | | | | 10.0 | |
| Mg. Malate $MgC_4H_4O_5 \cdot 3H_2O$ | | | | | | | | | 25.0 | | |
| Mg. Oleate $Mg(C_{18}H_{33}O_2)_2$ | | | | | 10.0 | | | | | | |
| Mg. Propionate $Mg(C_3H_5O_2)_2 \cdot H_2O$ | | | | | | | | 28.0 | | | |
| Mg. Salicylate $Mg(C_7H_5O_3)_2 \cdot 4H_2O$ | | | | | | | | | | 3.0 | |
| Mg. Sulfate $MgSO_4 \cdot 7H_2O$ | | | | | | | | | | 28.0 | |
| Mg. Valerate $Mg(C_5H_9O_2)_2$ | | | | | | | | | 25.0 | | |
| Mg. Ion $Mg^{++}$ | 4.0 | 3.9 | 4.0 | 5.2 | 3.2 | 4.3 | 3.5 | 3.0 | 5.5 | 3.8 | 4.0 |
| Propylene Glycol $CH_3CHOH\,CH_2OH$ | 31.7 | | 30.0 | 20.0 | 30.0 | 32.0 | | 25.0 | 35.0 | | |
| Ethanol $C_2H_5OH$ | | 35.0 | | 20.0 | | | | | | 10.0 | 34.0 | 65.5 |
| n-propanol $C_3H_7OH$ | | | | | | | 30.0 | 30.0 | 20.0 | | |
| Glycerol $(CH_2OH)_2CHOH$ | | | | | 15.0 | | 10.0 | | | | |
| Readily Available Liquid Energy Source | 31.7 | 35.0 | 30.0 | 40.0 | 45.0 | 62.0 | 40.0 | 45.0 | 45.0 | 34.0 | 65.5 |
| Water $H_2O$ | 31.7 | 30.0 | 20.0 | 15.0 | 15.0 | 1.0 | 32.0 | 25.0 | 5.0 | 25.0 | — |

| | 12 | 13 | 14 | 15 | 16 | 17 | 18 | 19 | 20 | 21 |
|---|---|---|---|---|---|---|---|---|---|---|
| Mg. Acetate | | | 34.5 | 30.0 | | 17.5 | | 17.5 | | |

TABLE I-continued
WEIGHT PERCENT OF COMPONENTS IN FEED COMPOSITIONS OF EXAMPLES 1-21

| Component | | | | | | | | | | |
|---|---|---|---|---|---|---|---|---|---|---|
| Mg $(C_2H_3O_2)_2 \cdot 4H_2O$ | | | | | | | | | | |
| Mg. Acetylsalicylate | | | | | | | | | | |
| Mg $(CH_3COO$-$C_6H_4COO)_2$ | | | | | | | | | | |
| Mg. Biphosphate | | | | | | | | | | |
| Mg $H_4(PO_4)_2 \cdot 3H_2O$ | | | | | | | | | | |
| Mg. Bisulfate | | | | | | | | | | |
| Mg $H_2(SO_4)_2$ | | | | | | | | | | |
| Mg. Butyrate | | | | | | | | | | |
| Mg $(C_4H_7O_2)_2$ | | | | | | | | | | |
| Mg. Chloride | | | 33.5 | 17.5 | | 17.5 | | | | |
| Mg $Cl_2 \cdot 6H_2O$ | | | | | | | | | | |
| Mg. Citrate | | | | | | | | | | |
| $Mg_3(C_6H_5O_7)_2 \cdot 14H_2O$ | | | | | | | | | | |
| Mg. Lactate | | | | 8.0 | | | | | | |
| $Mg(C_3H_5O_3)_2 \cdot 3H_2O$ | | | | | | | | | | |
| Mg. Malate | | | | | | | | | | |
| Mg $C_4H_4O_5 \cdot 3H_2O$ | | | | | | | | | | |
| Mg. Oleate | | | | 4.0 | | 5.0 | | | | |
| Mg $(C_{18}H_{33}O_2)_2$ | | | | | | | | | | |
| Mg. Propionate | | | | | | | | | | |
| Mg $(C_3H_5O_2)_2 \cdot H_2O$ | | | | | | | | | | |
| Mg. Salicylate | | 7.7 | | | | | | | | |
| Mg $(C_7H_5O_3)_2 \cdot 4H_2O$ | | | | | | | | | | |
| Mg. Sulfate | | 15.4 | | | | | | | 30.0 | 15.0 |
| Mg $SO_4 \cdot 7H_2O$ | | | | | | | | | | |
| Mg. Valerate | 33.3 | | | | | 30.0 | | | | |
| Mg $(C_5H_9O_2)_2$ | | | | | | | | | | |
| Mg. Ion | 3.5 | 2.0 | 3.9 | 4.0 | 4.0 | 4.0 | 3.3 | 4.0 | 2.9 | 1.4 |
| $Mg^{++}$ | | | | | | | | | | |
| Propylene Glycol | | | | 32.0 | 32.5 | | | | | 40.0 |
| $CH_3CHOH$ $CH_2OH$ | | | | | | | | | | |
| Ethanol | 66.7 | 30.8 | 65.5 | 30.0 | | | | 35.0 | | |
| $C_2H_5OH$ | | | | | | | | | | |
| n-propanol | | | | | | 65.0 | 50.0 | 30.0 | 20.0 | 45.0 |
| $C_3H_7OH$ | | | | | | | | | | |
| Glycerol | | 46.1 | | | 30.0 | | 15.0 | | 50.0 | |
| $(CH_2OH)_2CHOH$ | | | | | | | | | | |
| Readily Available Liquid Energy Source | 66.7 | 76.9 | 65.5 | 62.0 | 62.5 | 65.0 | 65.0 | 65.0 | 70.0 | 85.0 |
| Water | — | — | — | — | — | — | — | — | — | — |
| $H_2O$ | | | | | | | | | | |

Obviously many modifications and variations of the present invention are possible in light of the above teachings. It is therefore to be understood that, within the scope of the appended claims, the invention may be practiced otherwise than as specifically described.

We claim:

1. A liquid feed composition consisting essentially of:
   a readily available liquid energy source selected from the group consisting of propylene glycol, ethanol, normal propanol, glycerol, and combinations thereof, said energy source being present in said composition in amounts ranging from about 10 percent to about 90 percent by weight of said composition; and
   magnesium ions, derived from magnesium salts by completely dissolving said salts in said energy source, whereby said composition is made field stable and can be left unattended in the field without separation of said salts;
   said magnesium ions being present in said composition in amounts ranging from about 1 percent to about 6 percent by weight of said composition;
   said composition having a pH less than or equal to 7.0; and
   said composition being effective to avert nutritional tetany in livestock.

2. The liquid feed composition of claim 1 further consisting essentially of:
   added water being present in said composition in amounts ranging from about 1 percent to about 50 percent by weight of said composition.

3. The liquid feed composition of claim 2 wherein said energy source is propylene glycol present in said composition at about 31.7 percent by weight; said magnesium salts are magnesium acetate and magnesium chloride hexahydrate, said magnesium ions being present in said composition at about 4.0 percent by weight; and said added water is present in said composition at about 31.7 percent by weight of said composition.

* * * * *